United States Patent
Keiser

(10) Patent No.: US 7,003,523 B1
(45) Date of Patent: Feb. 21, 2006

(54) CONFIGURABLE SOFTWARE SYSTEM FOR AUTOMATICALLY STORING COMPUTER FILES

(75) Inventor: Richard G. Keiser, New York, NY (US)

(73) Assignee: Revolutionary Learning Systems, Inc., New York, NY (US)

(*) Notice: Subject to any disclaimer, the term of this patent is extended or adjusted under 35 U.S.C. 154(b) by 339 days.

(21) Appl. No.: 09/916,922

(22) Filed: Jul. 26, 2001

Related U.S. Application Data

(60) Provisional application No. 60/221,333, filed on Jul. 26, 2000.

(51) Int. Cl.
G06F 17/30 (2006.01)

(52) U.S. Cl. ............... 707/100; 707/101; 707/102; 707/103 R; 707/104.1; 707/3; 707/4; 717/108; 717/116; 717/100

(58) Field of Classification Search .......... 368/29; 707/3, 102, 7, 100, 101, 103 R, 104.1, 4; 710/58; 370/447; 711/158; 725/142; 717/100, 717/108, 116

See application file for complete search history.

(56) References Cited

U.S. PATENT DOCUMENTS

| | | | | |
|---|---|---|---|---|
| 4,774,707 A | * | 9/1988 | Raychaudhuri | 370/447 |
| 4,896,306 A | * | 1/1990 | Sanbongi et al. | 368/29 |
| 5,303,369 A | * | 4/1994 | Borcherding et al. | 718/704 |
| 5,715,443 A | * | 2/1998 | Yanagihara et al. | 707/3 |
| 5,778,359 A | * | 7/1998 | Stent | 707/4 |
| 5,828,904 A | * | 10/1998 | Batson et al. | 710/58 |
| 6,061,054 A | * | 5/2000 | Jolly | 715/500.1 |
| 6,163,773 A | * | 12/2000 | Kishi | 706/16 |
| 6,272,606 B1 | * | 8/2001 | Dorricott et al. | 711/158 |
| 6,357,040 B1 | * | 3/2002 | Porter | 717/154 |
| 6,417,873 B1 | * | 7/2002 | Fletcher et al. | 345/853 |
| 2002/0019990 A1 | * | 2/2002 | Sincaglia et al. | 725/142 |

FOREIGN PATENT DOCUMENTS

EP 0646868 * 4/1995

* cited by examiner

Primary Examiner—Frantz Coby
(74) Attorney, Agent, or Firm—Wolf, Greenfield & Sacks, P.C.

(57) ABSTRACT

A configurable software system for automatically storing and indexing computer files. Information about the usage characteristics of a computer file are compared against a second set of data, for example, a schedule of events with dates, times, etc. If this comparison results in a match, data from the second set are associated with the computer file. Data resulting from such associations are stored and searchable.

22 Claims, 14 Drawing Sheets

Fig. 2

| ACTIVITY $A_{sch}$ | DAY(S) $D_{sch}$ | TIME(S): $T_{sch}$ | | OTHER SCHEDULE ATTRIBUTES | | | | |
|---|---|---|---|---|---|---|---|---|
| | | Start-Time: $T_{sch1}$ | End-Time: $T_{sch2}$ | PROFESSOR NAME | COURSE NUMBER | BUILDING NAME | ROOM NUMBER | ETC. |
| Physics | Monday | 10:30 | 12:30 | Dr. Higgins | 6.012 | Boss Hall | 252 | |
| | Wednesday | 10:30 | 12:30 | Dr. Higgins | 6.012 | Boss Hall | 252 | |
| | Friday | 10:30 | 12:30 | Dr. Higgins | 6.012 | Boss Hall | 252 | |
| Spanish | Tuesday | 9:30 | 11:30 | Dr. Mendez | 22.021 | Angelica Hall | 131 | |
| | Thursday | 9:30 | 11:30 | Dr. Mendez | 22.021 | Angelica Hall | 131 | |
| Etc. | | | | | | | | |

Schedule for Steven Rogers:

| ACTIVITY $A_{sch}$ | DATE $D_{sch}$ | TIME(S): $T_{sch}$ | | MEETING CITY | OTHER SCHEDULE ATTRIBUTES | |
|---|---|---|---|---|---|---|
| | | Start-Time: $T_{sch1}$ | End-Time: $T_{sch2}$ | | MEETING BUILDING | PARTICIPANTS |
| Heinz Acquisition Meeting | Monday, Sept 11, 2000 | 8:00 | 10:30 | Pittsburgh | Westin Hotel | Steven Rogers, Jack Welsh |
| Project Sell Meeting | Wednesday, Nov 8, 2000 | 9:30 | 11:30 | New York | GE Building | Steven Rogers, John Devers, Diane Chang |
| Lunch with Anne Miller | Thursday, Nov 16, 2000 | 12:00 | 13:00 | New York | Royalton Hotel | Steven Rogers, Anne Miller |

Fig. 4

CONFIGURABLE SOFTWARE SYSTEM FOR AUTOMATICALLY STORING COMPUTER FILES

CROSS-REFERENCE TO RELATED APPLICATIONS

This application claims the benefit, under 35 U.S.C. §119(e), of the filing date of U.S. provisional application Ser. No. 60/221,333, filed Jul. 26, 2000.

FIELD OF THE INVENTION

This invention relates to a software application and computer interface for indexing and storing computer data files.

BACKGROUND OF THE INVENTION

When storing an electronic document, a computer user typically stipulates the file name and location where the file is to be stored. The file can be retrieved at a later time either by recalling the location where the file has been stored, or if the location has been forgotten, by searching through folders, sub-folders, and files to identify the desired file. This is a user-driven task, and retrieving files is often dependent on how adept the user is at remembering file names and locations. Finding a file when the location has been forgotten is often a time consuming task. This problem is increasing as the number and size of computer files increases. Many computer systems provide the user with a search capability that enables the user to search for files under a number of criteria. Common search criteria include file name, file type, date created or modified, and file content. The number of search criteria defines the flexibility or options a user has in searching for files. Having more criteria increases a user's ability to find files, enabling a better, more precise and efficient search.

SUMMARY OF THE INVENTION

One embodiment of the invention is directed to a process for associating scheduling data with a file consisting of the following acts: (A) stipulating a schedule of events with dates, times and activities; (B) using a computer, for example to create, modify, delete or access a current file; (C) comparing at least one characteristic of the current file against the schedule; (D) associating a searchable label to the current file when the current file matches at least one characteristic of the schedule; and (E) retrieving the current file using the label.

BRIEF DESCRIPTION OF THE DRAWINGS

FIG. 2 illustrates a sample user interface to an application that could be used to build a schedule of activities, dates, and times;

FIG. 3 illustrates a representation of sample data associated with a schedule of classes, for example, for a student;

FIG. 4 illustrates a representation of sample data associated with a schedule of meetings, for example, for a businessperson;

DETAILED DESCRIPTION

In accordance with one embodiment of the present invention, a configurable software system is provided for automatically assigning attributes to computer files. These attributes are stored and can be searched by a user to identify files. These attributes provide additional search criteria to the user, increasing search flexibility and enabling a better, more precise and efficient search.

Figure 2:
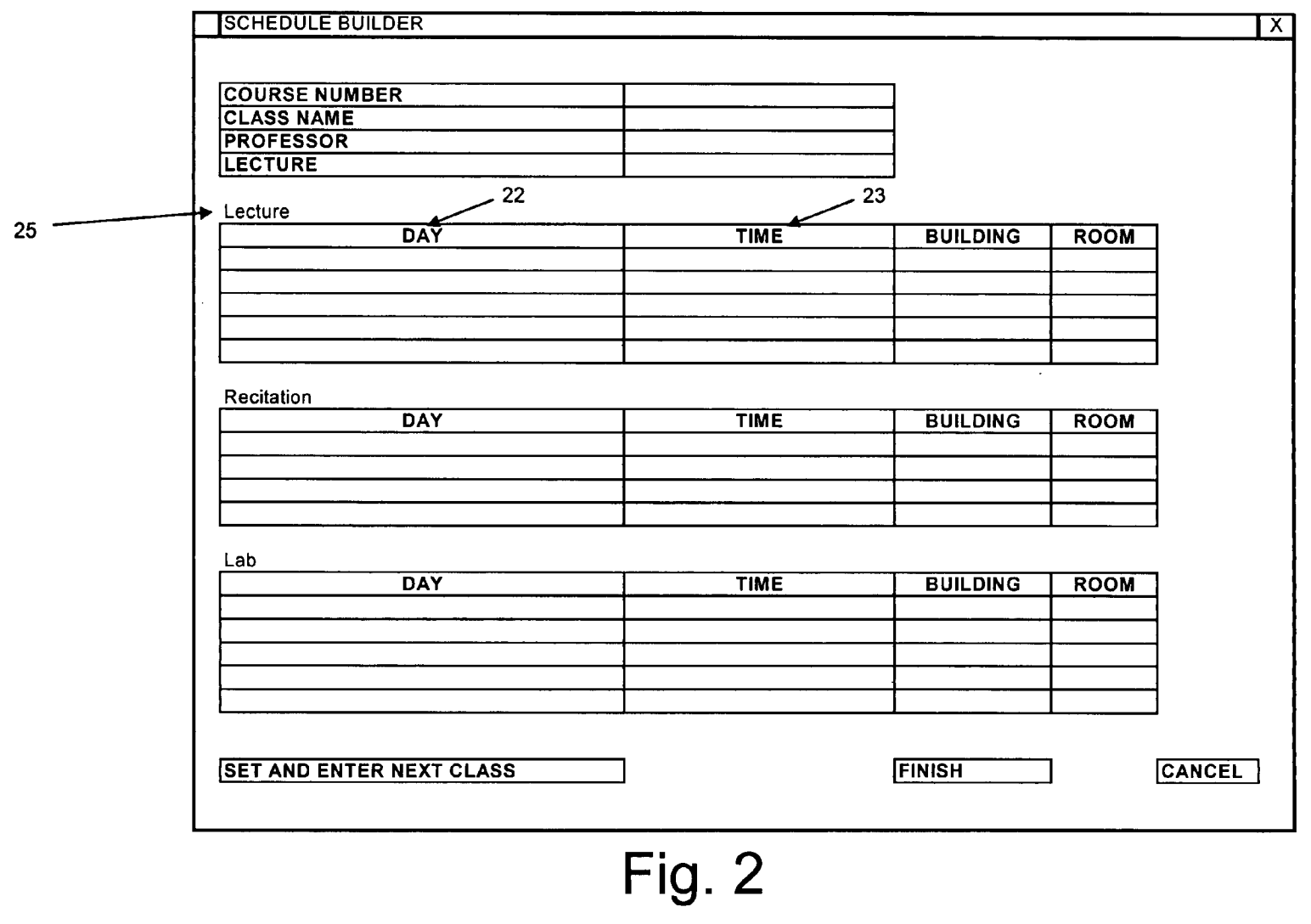

A first illustrative example of the configurable software system is described making reference to FIGS. 1–10. To begin, in FIG. 1, a user inputs (in act 11) a schedule into the computer system by using a user interface. A sample user interface is given in FIG. 2, although numerous other arrangements are possible. A user interface for entering a schedule may include information such as events, for example a Lecture (FIG. 2, 25); days, or date (FIG. 2, 22); times (FIG. 2, 23). In addition, related information pertaining to the event such as location, names of people associated with the event, etc., can also be captured. Schedule data can be laid out in multiple formats. Alternative data formats are shown in FIG. 3, where a mock schedule for a university student is depicted in table format; and FIG. 4, where a mock schedule for a businessperson is depicted. The nature and content of scheduling data can vary widely depending on the individual.

Once a schedule has been created, schedule data serve as a reference against which information regarding computer usage can be checked. As shown at act 12 in FIG. 1, as a user operates a computer, for example to access, modify, delete, or save files, information regarding current computer usage is accessed. This can be done in any of numerous ways. For example, current computer usage data can be derived by querying the date and time of operation. This information can reside in the computer's internal clock or operating system.

Figure 5:
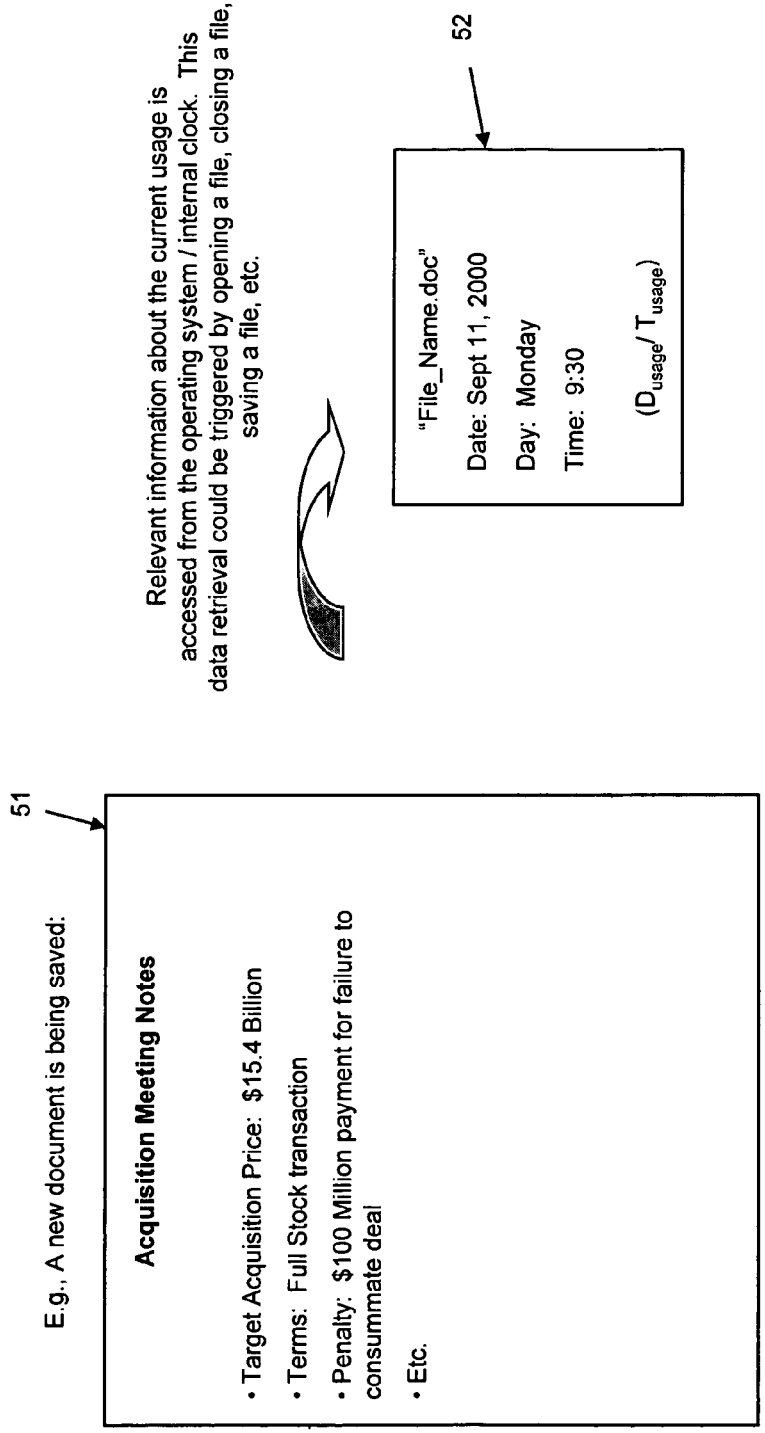
FIG. 5 illustrates a representation of the process by which relevant information is accessed about a new document, according to one embodiment of the invention.

As discussed, an example of information that may be accessed through the computer's internal clock and compared against schedule data is the date and time of computer usage. An example of this process is depicted in FIG. 5, where a new file, "Acquisition Meeting Notes," (FIG. 5, 51) is being saved. The event of "Saving" the document triggers the system to access the computer's internal clock to identify current date and time. It should be noted that the event of accessing a computer's internal clock is not dependent on employing the "Save" function, or any other function in particular. Accessing of the internal clock could be repeated frequently according to a pre-set interval, e.g., every two minutes, or triggered by a number of user events, such as opening a new file, closing a file, modifying a file, etc. Sample data accessed from the computer regarding usage, in this case, date and time regarding current usage, is depicted in FIG. 5 at 52. For clarity, these data have been labeled $D_{usage}$ and $T_{usage}$, respectively, where $D_{usage}$=Sep. 11, 2000; and $T_{usage}$=9:30 (military time). Accessible data about current usage is not limited to the date and time.

Figure 1:
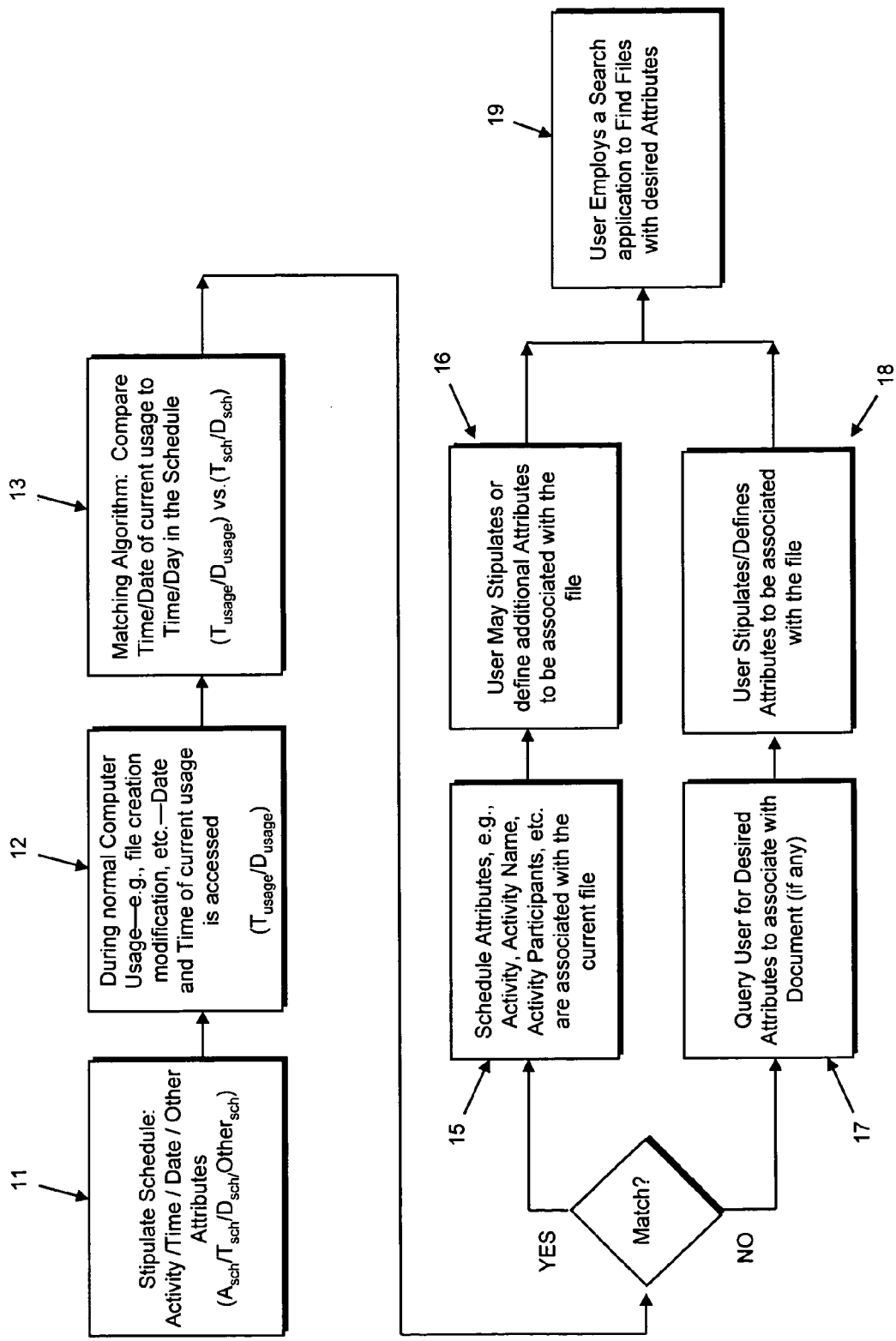
FIG. 1 illustrates a flow diagram of steps to carry out the filing and indexing process, according to one embodiment of the invention.
Figure 6:
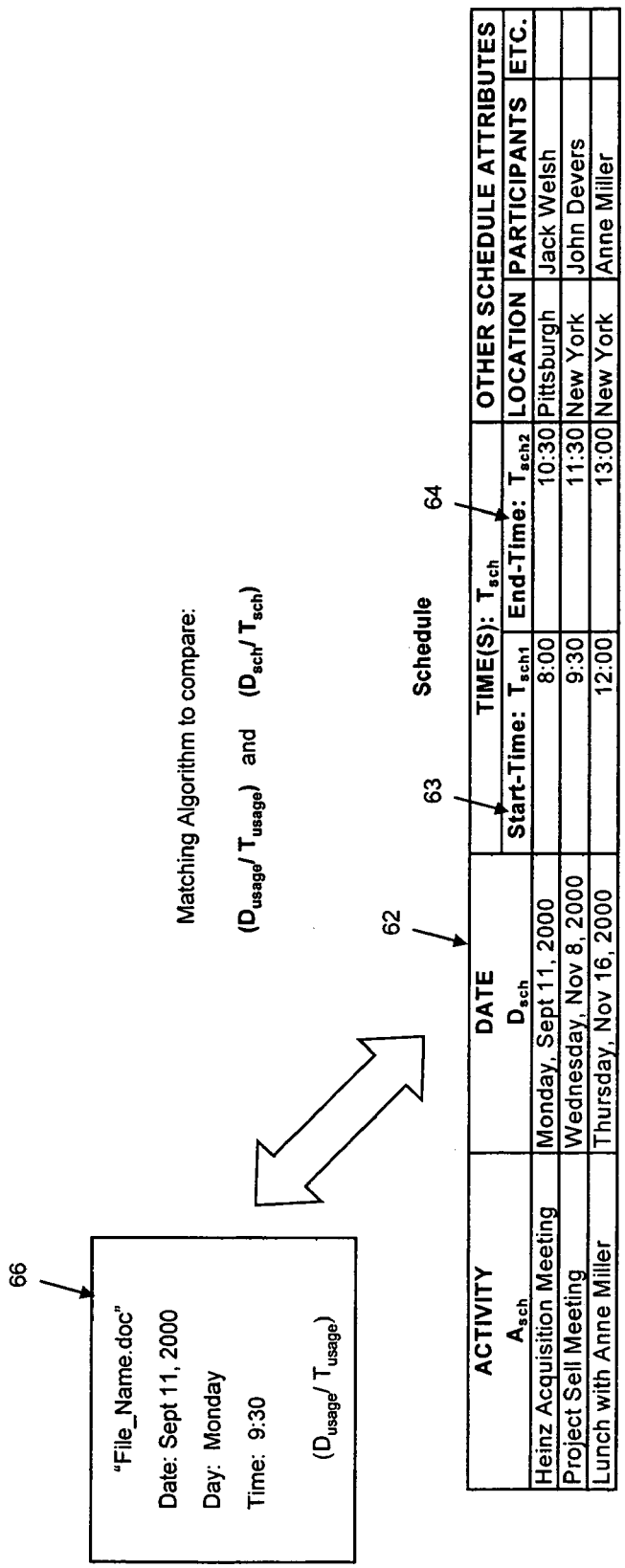
FIG. 6 illustrates an overview of the process for matching schedule attributes to a file, according to one embodiment of the invention.

Information about current computer usage is then compared (in act 13) to data captured in the schedule (FIG. 1). An illustrative example of this comparison is given in FIG. 6, where accessed data about usage (FIG. 6, 61), is compared against sample schedule data (FIG. 6, 62). For clarity, schedule date and time have been labeled, $D_{sch}$ and $T_{sch}$, respectively. $T_{sch}$ has two components, $T_{sch1}$ and $T_{sch2}$, to capture event start time and end time (FIG. 6, 63 and FIG. 6, 64). Much more data may reside in the schedule, for example location, participants, etc., as shown in FIG. 6, 65.

The process of comparing computer usage data to schedule data may take many forms. Many different comparison means, or matching algorithms, can be employed to achieve an effective comparison. As one example of a matching algorithm, $D_{usage}$ and $T_{usage}$ can be compared to $D_{sch}$ and $T_{sch}$. One illustrative Boolean expression for this sample algorithm is:

If $D_{usage}=D_{sch}$, and $T_{usage} \mu T_{sch1}$, and $T_{usage} [T_{sch2}$, then Match="Yes" Else, Match="No"

This would identify a match if the current date matched the schedule data, and the current time was within the time boundaries of an event stipulated in the schedule. As discussed, matching algorithms can take many forms. An example of an alternative algorithm is one where a modified $T_{usage}$, for example, $T_{usage}$+10 minutes, is compared to the schedule. This algorithm could take into account discrepancies between computer usage and the start time of events, potentially improving matching accuracy. Other more complex algorithms can be employed to improve matching accuracy under different usage conditions.

Figure 7:
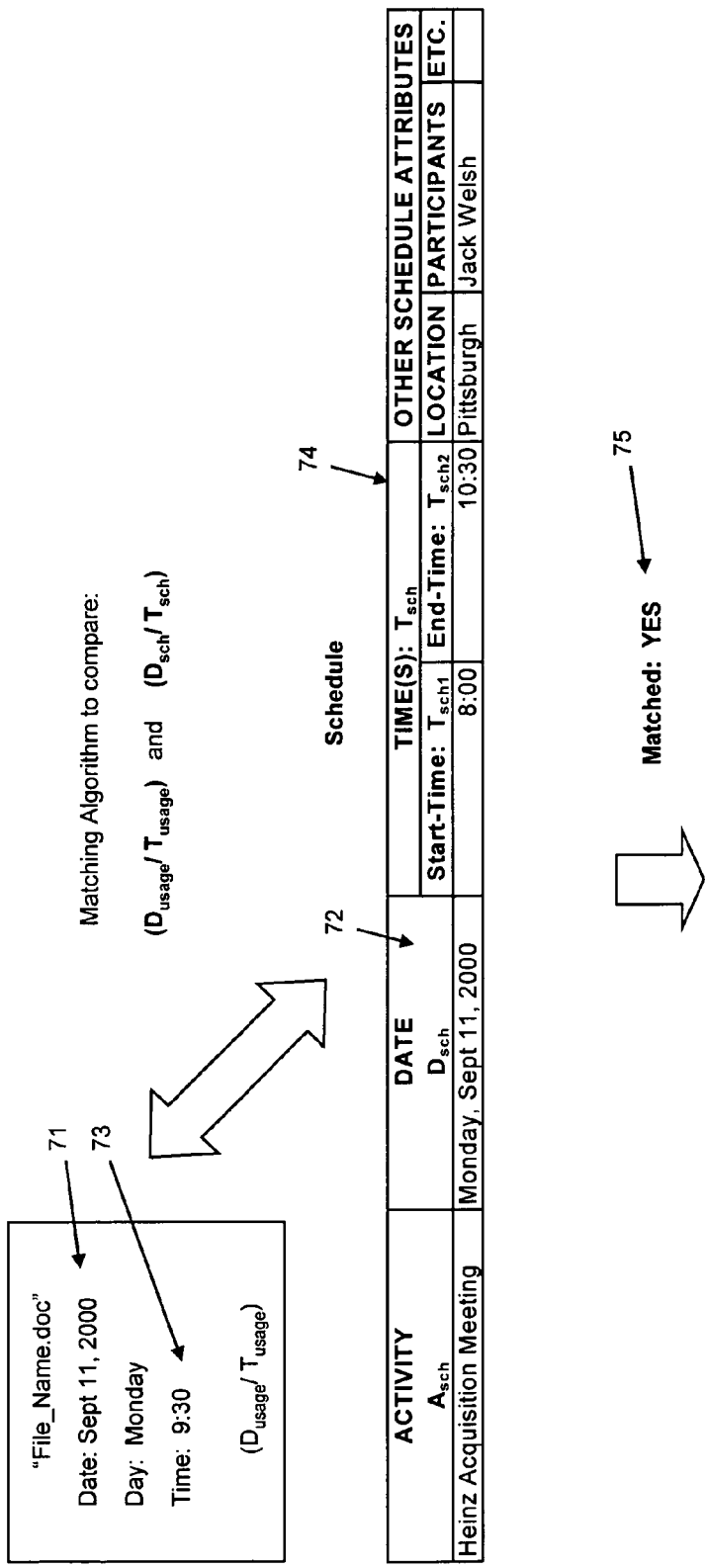
FIG. 7 illustrates an overview of the process associated with a positive match between file and schedule, according to one embodiment of the invention.
Figure 8:
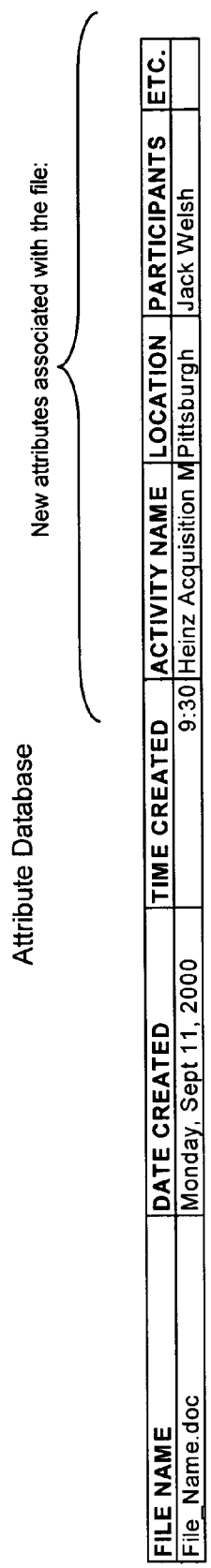
FIG. 8 illustrates a database structure where attributes associated with files are stored.

An overview of this process is illustrated in FIG. 7. Date of current computer usage (FIG. 7, 71) is compared to the date of an event in the schedule (FIG. 7, 72). In addition, the time of current computer usage (FIG. 7, 73) is compared to the times of an event in the schedule (FIG. 7, 74). Because the dates are equivalent, and the time of current usage is within the bounds of the times associated with an event in the schedule, a match is found ("Matched: YES"), (FIG. 7, 75).

Finding a successful match results in attributes from the matched event in the schedule, e.g., activity, date, time, location, participants, etc. being associated with the current file in act 15 (FIG. 1). This association can be executed automatically by the software, or by querying the user and asking for confirmation. This association can be stored within the scheduling program itself, or through other means, for example, storing attributes with files in a database. An example of this association is given in FIG. 8, where a file has been successfully associated with schedule attributes in a database structure.

If a successful match is found, additional acts, such as providing the user the opportunity to add or customize additional attributes to be associated with the file (act 16 in FIG. 1), can be incorporated into the process. Many user-definable features, such as customizing the degree to which file association is automated, can also be incorporated into the process. A further option could enable the user to cancel the association process altogether.

Figure 9:
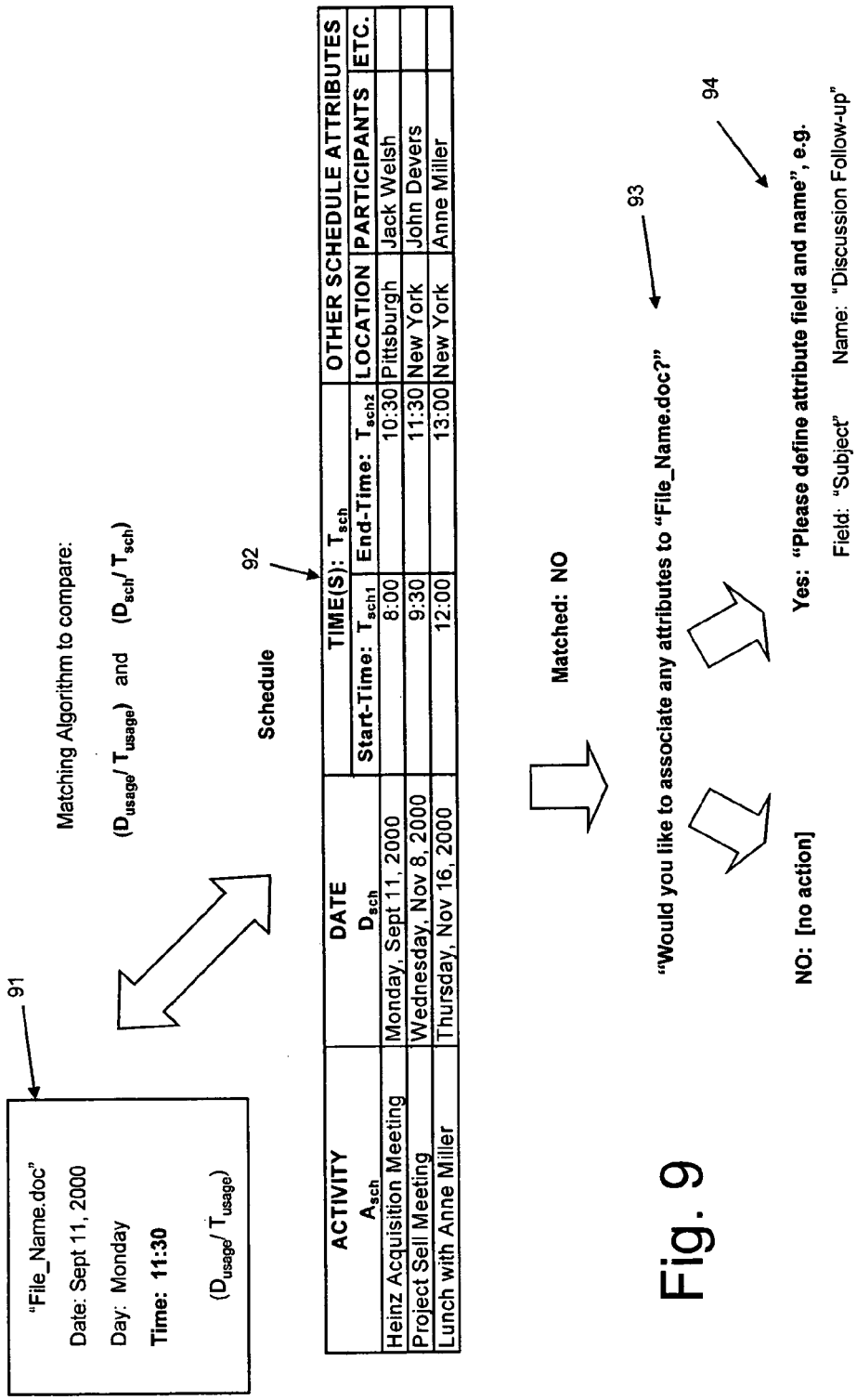
FIG. 9 illustrates an overview of the process associated with a negative match between file and schedule, according to one embodiment of the invention.

In the event of a negative match, (following the previous example):

If $D_{usage}=D_{sch}$, and $T_{usage} \mu T_{sch1}$, and $T_{usage} [T_{sch2}$, then Match="Yes" Else, Match="No"

the user can be queried (in act 17 in FIG. 1) directly for attributes to save or associate with the file, and the user can define attributes (act 18). An example of this process is given in FIG. 9, where data about the current file (FIG. 9, 91) do not match data associated with events in the schedule (FIG. 9, 92). In this example, the user is prompted to associate additional attributes to the file, (FIG. 9, 93). In this example, the user chooses to define and enter a new attribute, FIG. 9, 94. These data are then associated with the file. It is understood that the user may choose not to associate any attributes with a file, whether the result of a match is negative or positive, and that it is desirable that the user have some degree of flexibility in customizing the matching and file association process.

Figure 10:
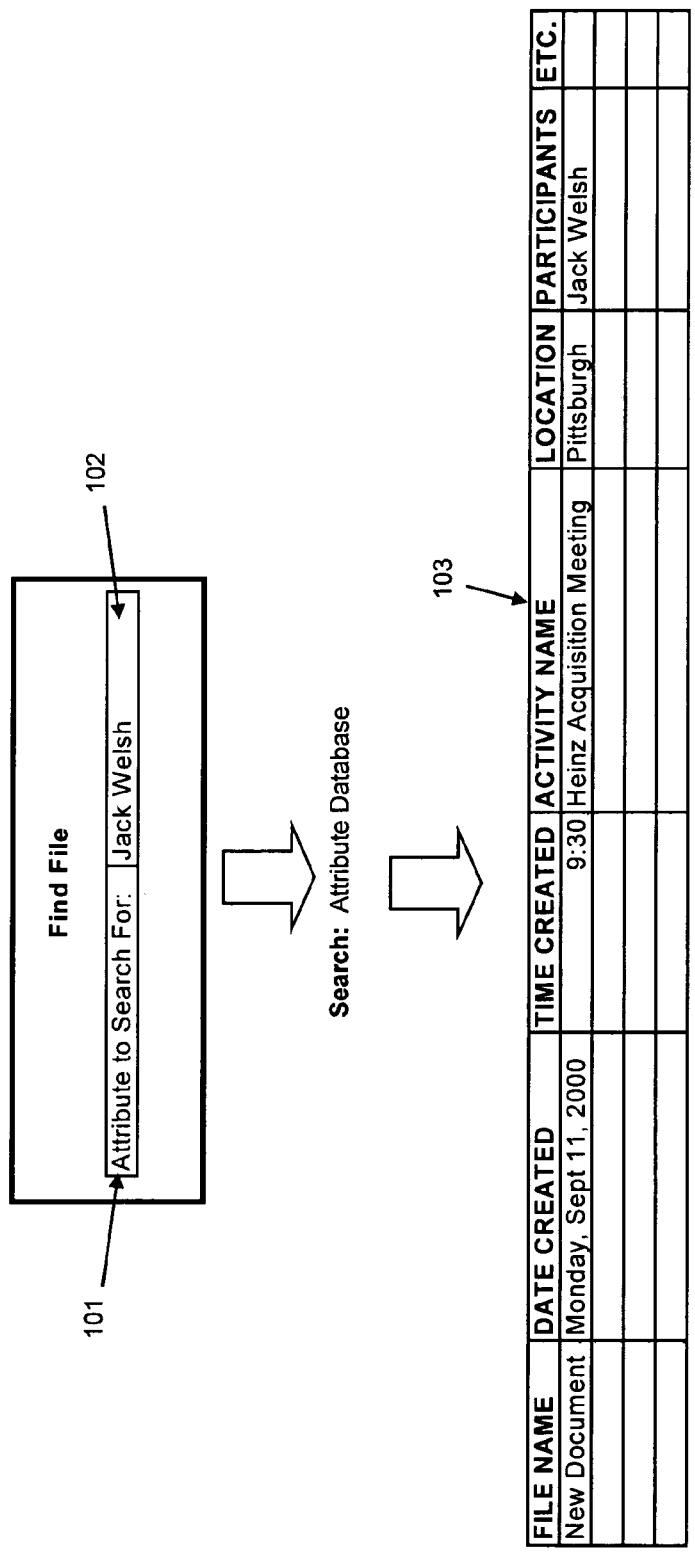
FIG. 10 illustrates a user interface with which the user can search for files with specified attributes.

The final act in the process relates to the retrieval of data, FIG. 1, 19. In the preceding acts, schedule attributes have been associated with files. The user is now capable of searching and identifying files with these attributes by employing a search tool (e.g., any common search tool). An illustrative example of the process and user interface for such a query is given in FIG. 10. In this example, a search window, "Find File" enables the user to search files by attributes (FIG. 10, 101). The data to be searched for is the name, "Jack Welsh" (FIG. 10, 102). The search functionality queries the database of files and associated attributes and returns the full results (FIG. 10, 103).

Figure 11:
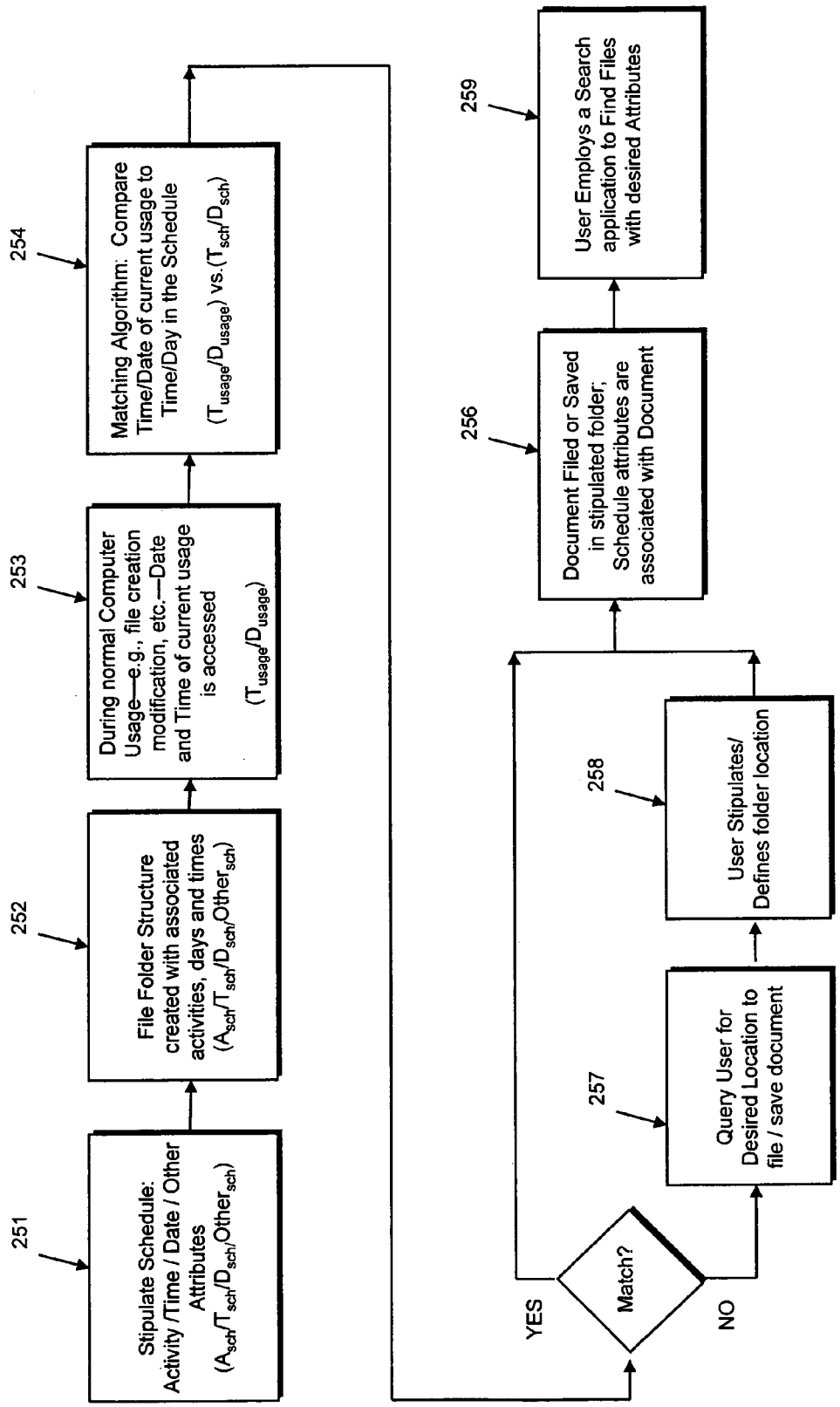
FIG. 11 illustrates a flow diagram of steps to carry out the filing and indexing process, according to another embodiment of the invention.

A second illustrative example of the configurable software system is shown in FIG. 11. To begin, in act 251, a user inputs a schedule into the system by using a user interface. A sample user interface is given in FIG. 2. As discussed previously, a user interface for entering a schedule typically includes information such as events, for example a Lecture (FIG. 2, 25); days, or date (FIG. 2, 22); times (FIG. 2, 23). In addition, related information pertaining to the event such as location, and names of people associated with the event, can also be captured (FIG. 2, 21). Schedule data can be laid out in multiple formats, alternative data formats are shown in FIG. 3, where a mock schedule for a university student is depicted in table format; and FIG. 4, where a mock schedule for a businessperson is depicted. The nature and content of scheduling data can vary widely depending on the individual.

Figure 12:
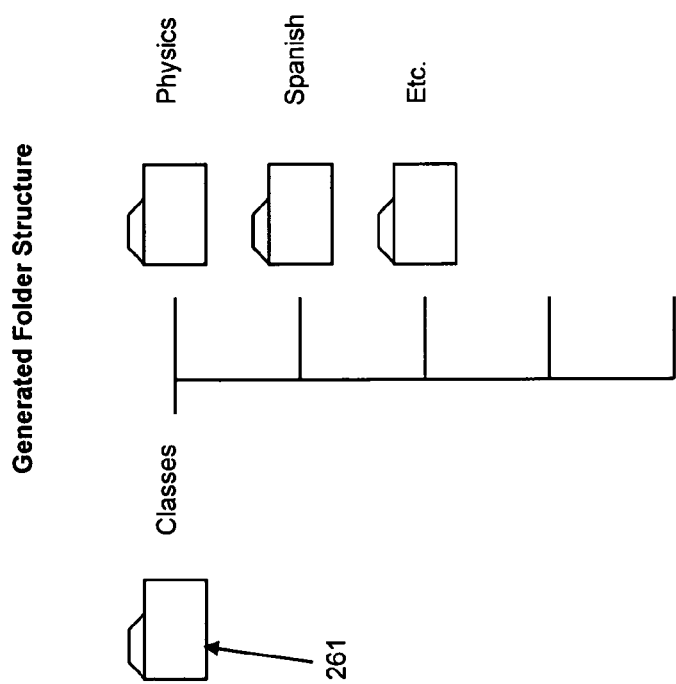
FIG. 12 illustrates a sample folder structure created through steps outlined in the process of FIG. 11.

Once a schedule has been created, a folder structure corresponding to said schedule is generated in act 252. An example of such a folder structure is given in FIG. 12. This folder structure corresponds to data shown in FIG. 3, where activities, "Physics" and "Spanish," (FIG. 3, 31), have been captured as file folders under the folder "Classes" 261 in FIG. 12.

Once a schedule and folder structure have been created, data associated with the schedule serve as a reference against which information regarding computer usage can be checked. As shown in act 253, as a user operates a computer, for example to access, modify, delete, or save files, information regarding current computer usage is accessed. This can be done in any of numerous ways as discussed above, including by querying the date and time of operation, which can reside in the computer's internal clock or operating system. As discussed previously, FIG. 5 illustrates this process.

Information about current computer usage is then compared (in act 254) to data captured in the schedule. The previously described matching process, algorithms and illustrations in FIGS. 6 and 7, are also applicable for this embodiment of the invention.

Figure 13:
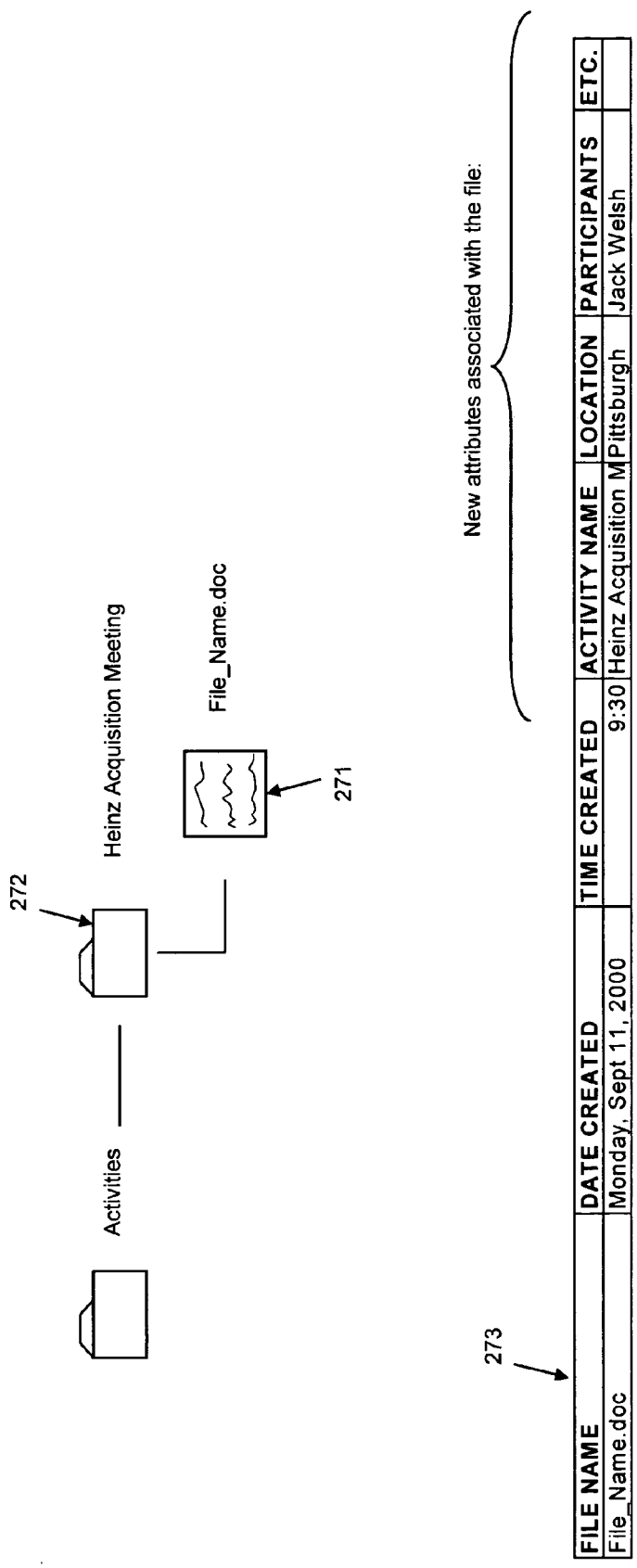
FIG. 13 illustrates the results of identifying a positive match between file and schedule, according to the process of FIG. 11.

Finding a successful match results in the current file being saved (in act 256) in the folder associated with the matched schedule data, and attributes associated with the matched schedule data being associated with the current file. This association can be executed automatically by the software, or by querying the user and asking for confirmation. This association can be stored within the scheduling program itself, or through other means, for example, storing attributes with files in a database. An example of this saving and association is given in FIG. 13, where a file "File_Name.doc" (FIG. 27, 271) has been successfully saved in a folder, "Heinz Acquisition Meeting" (FIG. 27, 272) and associated with schedule attributes in a database structure (FIG. 27, 273).

If a successful match is found, additional acts, such as providing the user the opportunity to add or customize additional attributes to be associated with the file, could be incorporated into the process. Many user-definable features, such as customizing the degree to which file association is automated, could also be incorporated into the process. A further option could enable the user to cancel the association and filing process altogether.

Figure 14:
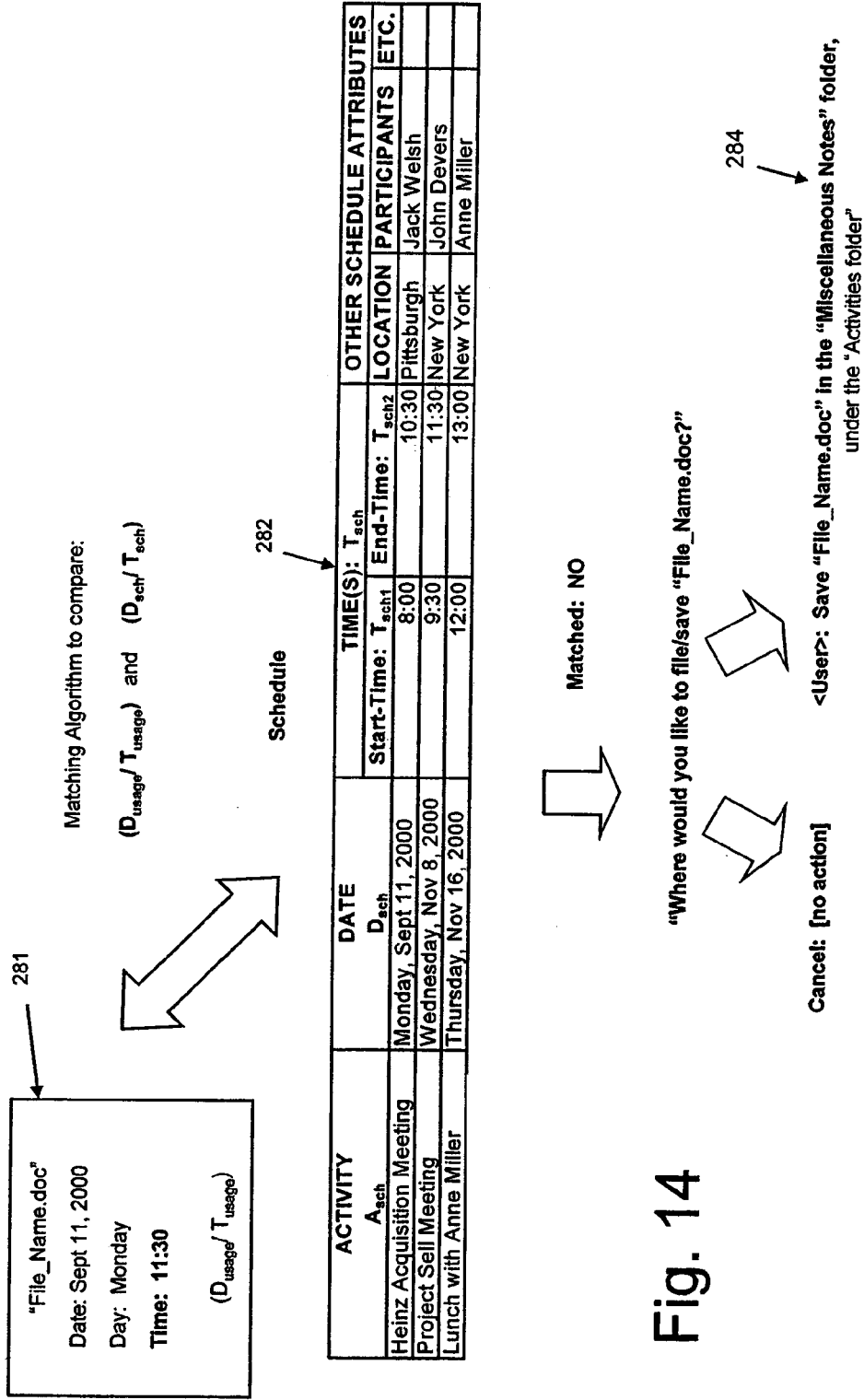
FIG. 14 illustrates an overview of a process associated with a negative match between file and schedule, according to another embodiment of the invention.

In the event of a negative match, the user can be queried (act 257) directly for the target folder or save destination. An example of this process is given in FIG. 14, where data about the current file (FIG. 28, 281) do not match data associated with events in the schedule (FIG. 28, 282). In this example, the user is prompted (in act 258) to associate additional attributes to the file. In this example, the user chooses to save the file in the Miscellaneous Folder 284, a subfolder of the Activities folder. Because there is no schedule data associated with this folder, no attributes are associated with the file by the system. It is understood that the user may have options with the system to add or customize attributes according to his or her preferences.

The final act in the process relates to the retrieval of data in act 259. In the preceding acts, folders and schedule attributes have been associated with files. The user is now capable of searching and identifying files with these attributes by employing a search tool. Again, an illustrative example of the process and user interface for such a query is given in FIG. 10. In this example, a search window, "Find File" enables the user to search files by attributes (FIG. 10, 101). The data to be searched for is the name, "Jack Welsh" (FIG. 10, 102). The search functionality queries the database of files and associated attributes and returns the full results.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for use in a computer system executing a first software program that processes a file, the computer system further comprising a data set that comprises data that is independent of the file, the method comprising acts of:

(A) comparing at least one usage characteristic of the file to the data set; and (B) when the at least one usage characteristic of the file matches at least one characteristic of the data set, associating data from the data set with the file, wherein the at least one usage characteristic comprises at least a current date when the first software program is processing the file.

2. The method of claim 1, wherein the at least one usage characteristic includes a current time when the first software program is processing the file.

3. The method of claim 1, wherein the first software program has a user, wherein the user has a schedule and activities, and wherein the data set comprises data representative of at least one of the user's schedule and activities.

4. The method of claim 1, wherein the act (A) comprises an act of accessing the data set by interfacing with a second software program that is different from the first software program.

5. The method of claim 4, wherein the second software program is a schedule planning software program.

6. The method of claim 2, wherein the act (A) comprises an act of comparing the current date and time when the first software program is processing the file against a schedule including dates and times for a plurality of events; and wherein the act (B) is performed automatically.

7. The method of claim 1, wherein the act (B) comprises an act of automatically generating a folder structure based at least in part on information in the data set.

8. The method of claim 1, wherein the first software program has a user, and wherein the method further comprises acts of:

receiving data entered manually by the user; and associating the manually entered data with the file.

9. The method of claim 1, further comprising an act of storing the data associated with the file in the act (B) in a data structure having a searching capability.

10. A method comprising acts of:

(A) using a computer to create, modify, delete or access a file;

(B) comparing at least one characteristic of the file against a schedule comprising events with dates, times and activities;

(C) associating a searchable label with the file when the at least one characteristic of the file matches at least one characteristic of the schedule; and (D) retrieving the file using the label.

11. A method comprising acts of:

(A) interfacing with a schedule planning program to import a schedule of events with dates, times, activities, and related data;

(B) using a computer to create, modify, delete or access a file;

(C) comparing at least one characteristic of the file against the schedule;

(D) associating a searchable label with the file when the at least one characteristic of the file matches at least one characteristic of the schedule; and (E) retrieving the file using the label.

12. At least one computer readable medium encoded with program for use in a computer system executing a first software program that processes a file, the computer system further comprising a data set that comprises data that is independent of the file, the program, when executed by the computer system, performing a method comprising acts of:

(A) comparing at least one usage characteristic of the file to the data set; and (B) when the at least one usage characteristic of the file matches at least one characteristic of the data set, associating data from the data set with the file, wherein the at least one usage characteristic comprises at least a current date when the first software program is processing the file.

13. The at least one computer readable medium of claim 12, wherein the at least one usage characteristic includes a current time when the first software program is processing the file.

14. The at least one computer readable medium of claim 12, wherein the first software program has a user, wherein the user has a schedule and activities, and wherein the data set comprises data representative of at least one of the user's schedule and activities.

15. The at least one computer readable medium of claim 12, wherein the act (A) comprises an act of accessing the data set by interfacing with a second software program that is different from the first software program.

16. The at least one computer readable medium of claim 15, wherein the second software program is a schedule planning software program.

17. The at least one computer readable medium of claim 12, wherein the act (A) comprises an act of comparing a current time when the first software program is processing the file against a schedule including dates and times for a plurality of events; and
wherein the act (B) is performed automatically.

18. The at least one computer readable medium of claim 12, wherein the act (B) comprises an act of automatically generating a folder structure based at least in part on information in the data set.

19. The at least one computer readable medium of claim 12, wherein the first software program has a user, and wherein the method further comprises acts of:

receiving data entered manually by the user; and
associating the manually entered data with the file.

20. The at least one computer readable medium of claim 12, further comprising an act of storing the data associated with the file in the act (B) in a data structure having a searching capability.

21. At least one computer readable medium encoded with a program for execution on a computer system, the program, when executed by the computer system, performing a method comprising acts of:

(A) using a computer to create, modify, delete or access a file;

(B) comparing at least one characteristic of the file against a schedule comprising events with dates, times and activities;

(C) associating a searchable label with the file when the at least one characteristic of the file matches at least one characteristic of the schedule; and (D) retrieving the file using the label.

22. At least one computer readable medium encoded with a program for execution on a computer system, the program, when executed by the computer system, performing a method comprising acts of:

(A) interfacing with a schedule planning program to import a schedule of events with dates, times, activities, and related data;

(B) using a computer to create, modify, delete or access a file;

(C) comparing at least one characteristic of the file against the schedule;

(D) associating a searchable label with the file when the at least one characteristic of the file matches at least one characteristic of the schedule; and (E) retrieving the file using the label.

* * * * *